United States Patent
Kawamoto et al.

(10) Patent No.: US 9,170,570 B2
(45) Date of Patent: Oct. 27, 2015

(54) COOLING APPARATUS FOR INTERNAL COMBUSTION ENGINE

(75) Inventors: Nobuki Kawamoto, Okazaki (JP); Yasuki Hashimoto, Okazaki (JP); Hiroshi Yamamoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 129 days.

(21) Appl. No.: 14/125,513

(22) PCT Filed: Jun. 12, 2012

(86) PCT No.: PCT/IB2012/001266
§ 371 (c)(1),
(2), (4) Date: Dec. 11, 2013

(87) PCT Pub. No.: WO2012/172422
PCT Pub. Date: Dec. 20, 2012

(65) Prior Publication Data
US 2014/0103847 A1 Apr. 17, 2014

(30) Foreign Application Priority Data
Jun. 14, 2011 (JP) .................... 2011-132571

(51) Int. Cl.
G05B 5/00 (2006.01)
G05B 11/18 (2006.01)
F01P 7/04 (2006.01)
F01P 7/08 (2006.01)

(52) U.S. Cl.
CPC ............... *G05B 11/18* (2013.01); *F01P 7/048* (2013.01); *F01P 7/08* (2013.01); *F01P 2025/66* (2013.01)

(58) Field of Classification Search
CPC .... F01P 2025/66; F01P 7/048; F02D 41/086; G05B 11/18
See application file for complete search history.

(56) References Cited

U.S. PATENT DOCUMENTS

| 5,133,302 A | 7/1992 | Yamada et al. |
| 5,561,243 A | 10/1996 | Machida |
| 2005/0061263 A1 | 3/2005 | Lee |
| 2006/0191500 A1 | 8/2006 | Sugiyama et al. |
| 2009/0164084 A1* | 6/2009 | Hawkins et al. ............ 701/102 |

FOREIGN PATENT DOCUMENTS

| CN | 1598262 A | 3/2005 |
| EP | 0084378 A1 | 1/1983 |
| EP | 1 500 536 A1 | 1/2005 |
| JP | 60-081422 A | 5/1985 |
| JP | 61-021826 U | 2/1986 |
| JP | 2-99220 | 8/1990 |

(Continued)

OTHER PUBLICATIONS

Japanese Office Action issued Sep. 2, 2014 in Japanese Patent Application No. 2011-132571.

*Primary Examiner* — Karen Masih
(74) *Attorney, Agent, or Firm* — Sughrue Mion, PLLC

(57) ABSTRACT

A cooling apparatus for an internal combustion engine includes a fan that cools a coolant by operating at least at a first drive voltage and a second drive voltage higher than the first drive voltage; and a control unit that drives the fan at the first drive voltage when a vehicle is driven at a low vehicle speed that is a vehicle speed lower than a vehicle speed threshold and a coolant temperature is higher than a fan low-voltage activation threshold.

12 Claims, 4 Drawing Sheets

(56) References Cited

FOREIGN PATENT DOCUMENTS

| | | | |
|---|---|---|---|
| JP | 598963 | A | 4/1993 |
| JP | 8200067 | A | 8/1996 |
| JP | 2005-273473 | A | 10/2005 |
| JP | 2006241984 | A | 9/2006 |

* cited by examiner

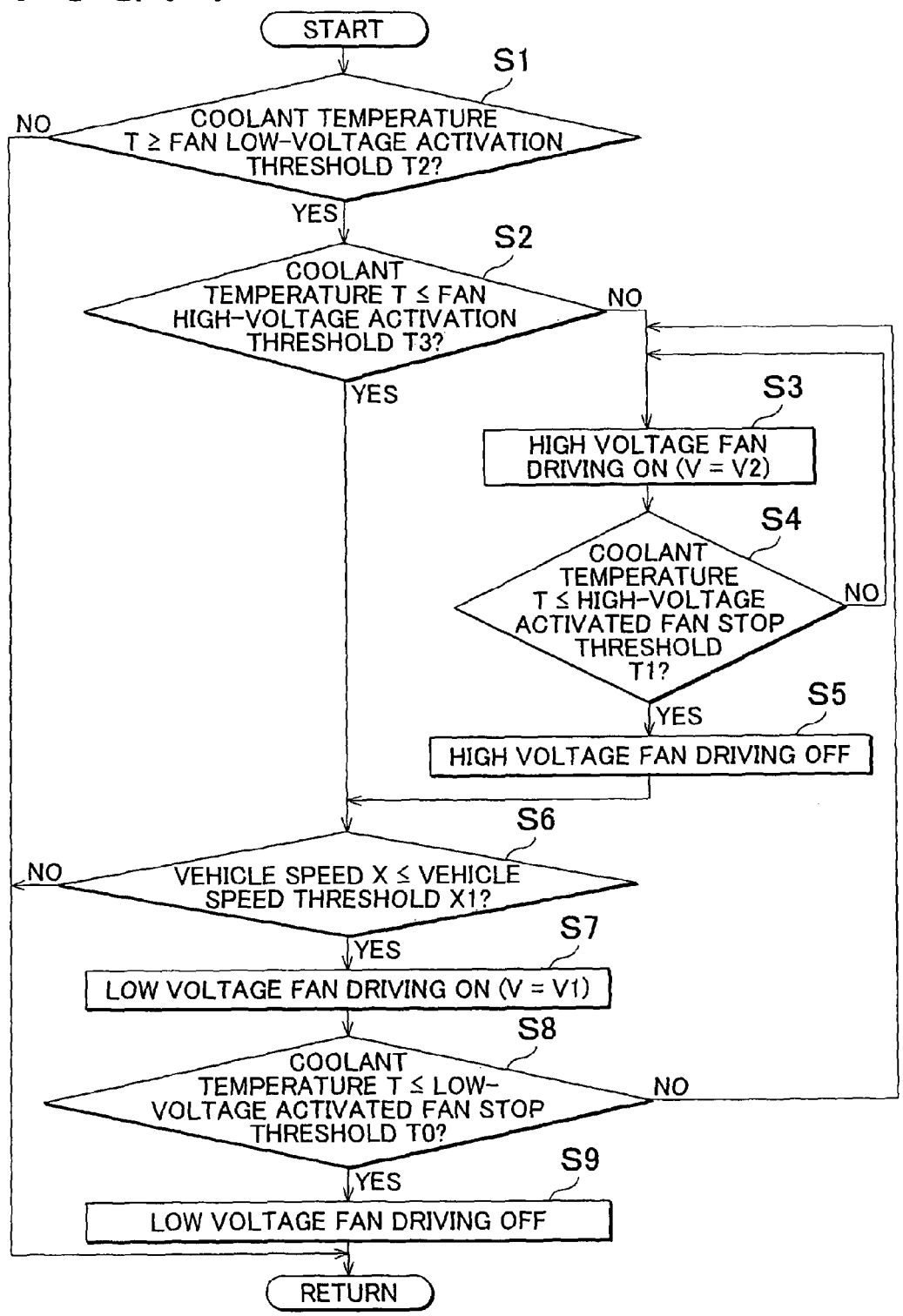

COOLING APPARATUS FOR INTERNAL COMBUSTION ENGINE

BACKGROUND OF THE INVENTION

1. Field of the Invention

This invention relates to a cooling apparatus for use in internal combustion engines.

2. Description of Related Art

Various proposals have been made regarding control of coolant temperature in internal combustion engines. For example, Japanese Patent Application Publication No. 60-81422 (JP 60-81422 A) discloses a control mechanism for an automobile electric-powered fan, which is designed to increase the rotational speed of the electric-powered fan with increase in coolant temperature.

In the meantime, there has recently been proposed to control the coolant temperature for the purpose of improving the fuel efficiency by suppressing knocking. Specifically, in order to suppress knocking, the coolant temperature is controlled to be lower than a common coolant temperature to suppress knocking so that the fuel efficiency is improved. When the coolant temperature is normally set lower in this manner, the ignition timing also need be adjusted accordingly.

When such coolant temperature control is used as a measure for improving the fuel efficiency, it may possibly induce problems as follows. When a vehicle enters an idling state or low-speed traveling state, the effect of cooling a radiator by running wind is reduced. This may result in increased coolant temperature. If the vehicle is rapidly accelerated after the increase of the coolant temperature, knocking may likely occur due to the ignition timing that is adjusted according to the coolant temperature set lower than normal. When an internal combustion engine is provided with a knock control system (KCS), a learning function of the KCS is activated once occurrence of knocking is detected. When the retardation amount at a low coolant temperature is increased by the learning function, it may possibly induce deterioration of fuel efficiency performance, or deficiency in motivity performance such as slow acceleration.

The control mechanism for an automobile electric-powered fan disclosed in JP 60-81422 A is designed to control rotation of the electric-powered fan according to increase in coolant temperature. According to this technique, in which control is performed with reference to the coolant temperature, the coolant temperature might be increased at some timing due to delayed response of the coolant temperature control, making it impossible to prevent occurrence of knocking. In addition, if the fan is activated frequently in order to keep the coolant in a low temperature state as much as possible, the fuel efficiency might be rather deteriorated due to increased power consumption by the fan or increased driving resistance. Furthermore, the frequent activation of the fan may possibly cause a problem of activation noise or increase of variation range of the coolant temperature. Still further, frequent activation of the fan will reduce the lifetime of the fan itself.

SUMMARY OF THE INVENTION

The invention provides a cooling apparatus for use in internal combustion engines which is capable of suppressing occurrence of knocking due to increased coolant temperature, as well as energy loss, variation in coolant temperature, and noise caused by driving of the fan.

A cooling apparatus for an internal combustion engine according to an aspect of the invention includes: a fan that cools a coolant by operating at least at a first drive voltage and a second drive voltage higher than the first drive voltage; and a control unit that drives the fan at the first drive voltage when a vehicle is driven at a low vehicle speed that is lower than a vehicle speed threshold and the coolant temperature is higher than a fan low-voltage activation threshold.

According to this configuration, the increase of the coolant temperature may be suppressed by performing drive control on the fan using a vehicle speed threshold. As a result, occurrence of knocking may be prevented and the fuel efficiency may be improved. Further, the drive is performed using the first drive voltage, which makes it possible to suppress energy loss, variation of coolant temperature, and noise caused by driving of the fan.

In the cooling apparatus for an internal combustion engine according to the configuration described above, the control unit may drive the fan at the second drive voltage when the coolant temperature does not become lower than a fan stop threshold after the fan is started at the first drive voltage. According to this configuration, when the coolant temperature cannot be lowered rapidly even after the fan is driven with the first drive voltage, the drive voltage may be raised to the second drive voltage to accelerate cooling of the coolant.

In the cooling apparatus for an internal combustion engine according to the configuration described above, the fan stop threshold may be set to a lower value than the fan low-voltage activation threshold. This configuration makes it possible to suppress hunting during operation of the fan.

In the cooling apparatus for an internal combustion engine according to the configuration described above, the control unit may drive the fan at the second drive voltage when the coolant temperature becomes higher than a fan high-voltage activation threshold that is higher than the fan low-voltage activation threshold.

In the cooling apparatus for an internal combustion engine according to the configuration described above, when a drive voltage of the fan is raised from the first drive voltage to the second drive voltage, the drive voltage may be raised stepwise.

In the cooling apparatus for an internal combustion engine according to the configuration described above, when a drive voltage of the fan is raised from the first drive voltage to the second drive voltage, the drive voltage may be raised linearly.

In the cooling apparatus for an internal combustion engine according to the configuration described above, the driving of the vehicle at the low vehicle speed includes an idling state of the internal combustion engine. When the internal combustion engine is in an idling state, the radiator is not exposed to running wind. Therefore, even when the combustion engine is in an idling state, the fan may be driven with the first drive voltage.

In the cooling apparatus for an internal combustion engine according to the configuration described above, it is possible to prevent occurrence of knocking due to increased coolant temperature, and energy loss, variation of coolant temperature, and noise caused by driving of the fan.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a flowchart showing another example of control of the cooling apparatus according to the embodiment of the invention.

DETAILED DESCRIPTION OF EMBODIMENTS

Figure 1:
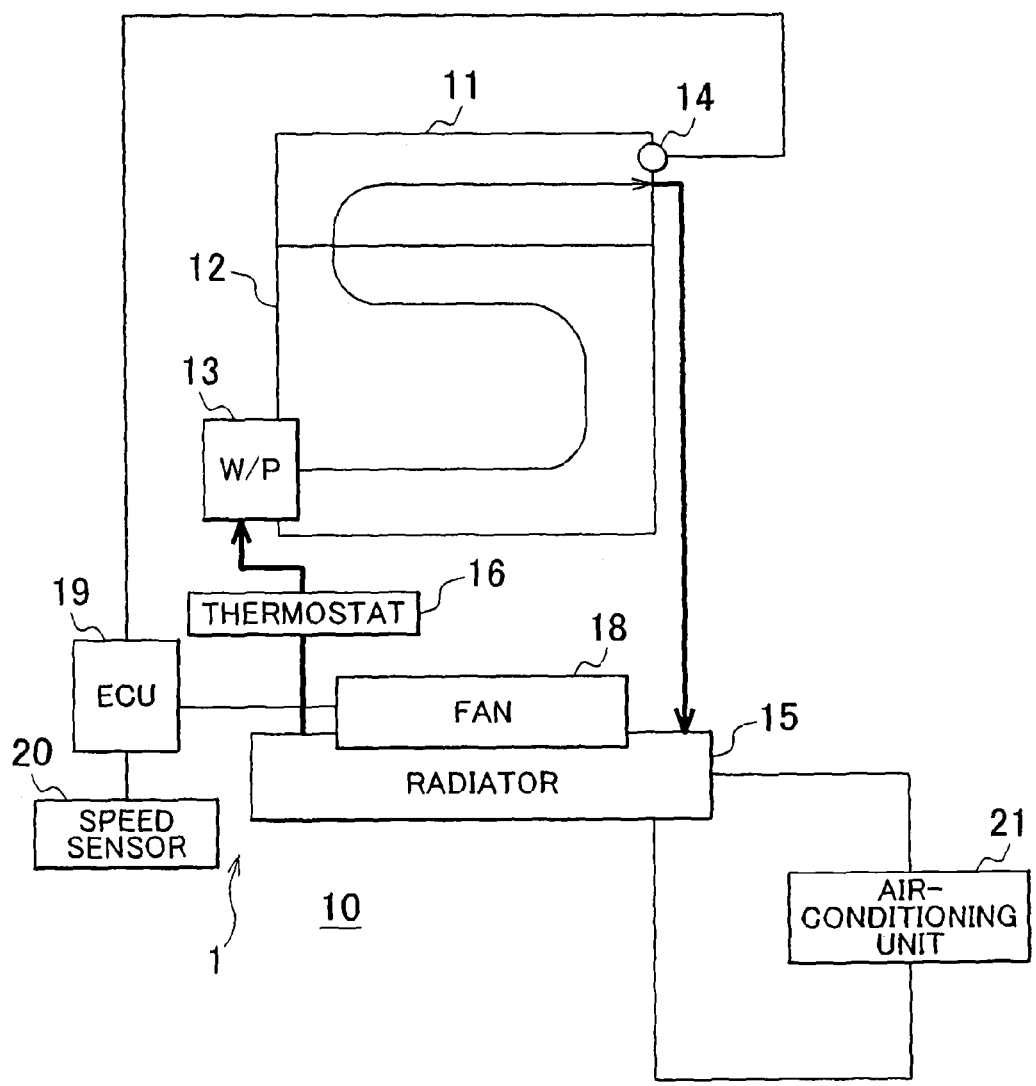
FIG. 1 is an explanatory diagram showing a schematic configuration of an internal combustion engine having a cooling apparatus according to an embodiment of the invention incorporated therein.

An embodiment of the invention will be described with reference to the accompanying drawings. It should be noted that, in the drawings, dimensions and proportions of components do not necessarily reflect the actual dimensions and proportions.

Referring to FIG. 1, a description will be made of a schematic configuration of an internal combustion engine 10 in which a cooling apparatus 1 for internal combustion engine (hereafter, simply referred to as the "cooling apparatus") according to an embodiment of the invention is incorporated. The internal combustion engine 10 has a cylinder head 11 and a cylinder block 12. A water pump (W/P) 13 is provided on a side of the cylinder block 12. A water jacket is provided in each of the cylinder head 11 and the cylinder block 12. A coolant fed under pressure by the water pump 13 flows through the cylinder block 12 and the cylinder head 11 in this order, and is once discharged to the outside from the cylinder head 11. A temperature sensor 14 is attached to this outlet of the coolant for measuring coolant temperature.

The internal combustion engine 10 has a radiator 15. The coolant discharged from the cylinder head 11 is introduced into the radiator 15. Having passed through the radiator 15, the coolant is again introduced into the water pump 13 through a thermostat 16. The internal combustion engine 10 also has a bypass passage for bypassing the radiator 15.

The internal combustion engine 10 has a fan 18 on the back side of the radiator 15. The fan 18 increases the airflow passing through the radiator 15 and cools down the coolant. Drive voltage V of this fan 18 is switchable between a first drive voltage V1 and a second drive voltage V2. The first drive voltage V1 is lower than the second drive voltage V2. When the drive voltage is raised from the first drive voltage V1 to the second drive voltage V2, the drive voltage can be changed stepwise. Alternatively, the drive voltage can be raised from the first drive voltage V1 to the second drive voltage V2 by changing the same linearly. The fan 18 is included in the cooling apparatus 1.

The internal combustion engine 10 has an electronic control unit (ECU) 19. The ECU 19 functions as a control unit for the cooling apparatus 1. The ECU 19 is electrically connected to the temperature sensor 14 and the fan 18, respectively. The ECU 19 is also electrically connected to a speed sensor 20. The ECU 19 stores a vehicle speed threshold X1 that is used for controlling the cooling apparatus 1. The ECU 19 also stores a fan low-voltage activation threshold T2 and a low-voltage activated fan stop threshold T0. The ECU 19 further stores a fan high-voltage activation threshold T3 for driving the fan 18 at the second drive voltage V2 and a high-voltage activated fan stop threshold T1. The relationship among the temperatures is represented as T0<T1<T2<T3. The high-voltage activated fan stop threshold T1 is set to a lower threshold (i.e., to a higher temperature) than the low-voltage activated fan stop threshold T0. This means that the fan 18 is stopped at a higher temperature when the fan 18 is operating at the second drive voltage V2 (higher voltage) than when it is operating at the first drive voltage V1. This prevents the fan 18 from being driven in a state of high power consumption. Thus, the fan 18 is suppressed from being driven at the second drive voltage V2, which provides advantageous effects of reducing energy loss and noise, and suppressing variation of coolant temperature.

An air-conditioning unit 21 is connected to the internal combustion engine 10. Specifically, the air-conditioning unit 21 is provided separately from the radiator 15. A capacitor is arranged together with the radiator 15 to cool an air-conditioner refrigerant. The fan 18 is sometimes driven at the first drive voltage V1 or a low voltage close to the first drive voltage V1 during operation of the air-conditioning unit 21. The cooling apparatus 1 according to this embodiment is able to drive the fan 18 at the first drive voltage V1 on the condition that the vehicle is traveling at a low speed and the coolant temperature exceeds the fan low-voltage activation threshold, regardless of whether the air-conditioning unit 21 is operating.

By setting the coolant temperature lower than normal, the internal combustion engine 10 suppresses occurrence of knocking. The internal combustion engine 10 has a KCS mounted thereon, and has a learning function to retard the ignition timing when detecting occurrence of knocking.

Figure 2:
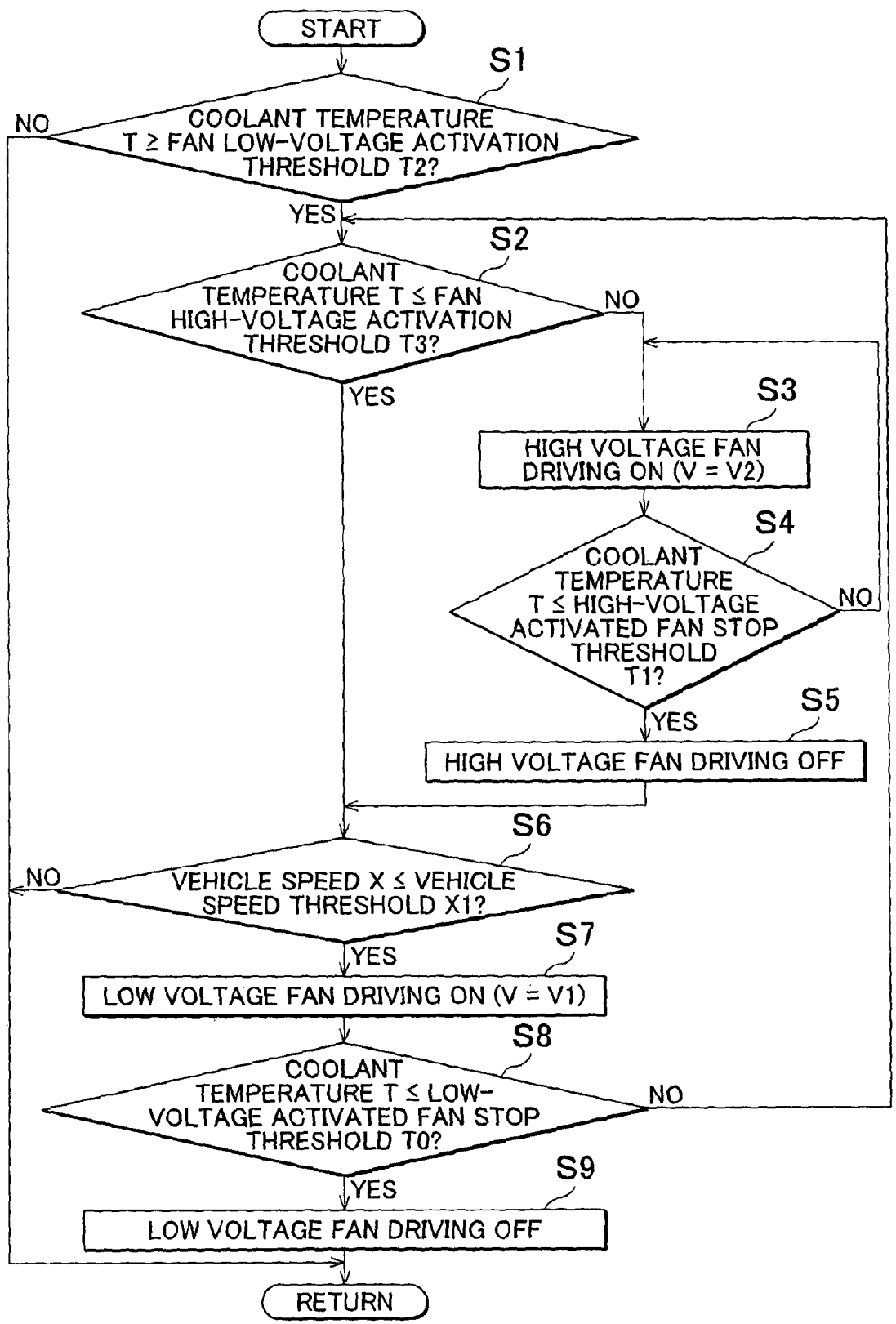
FIG. 2 is a flowchart showing an example of control of the cooling apparatus according to the embodiment of the invention.
Figure 3:
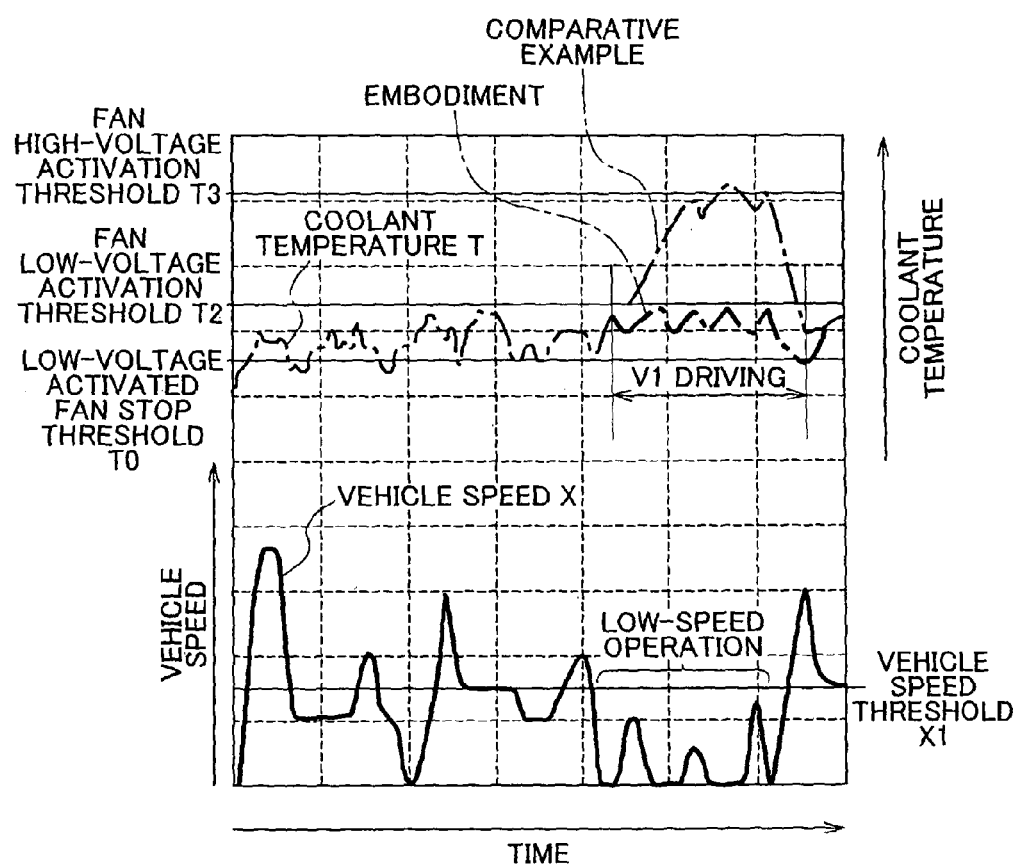
FIG. 3 is a graph showing variation of vehicle speed and variation of coolant temperature in a vehicle having an internal combustion engine in which the cooling apparatus according to the embodiment of the invention is incorporated.

Control and operation of the cooling apparatus 1 configured as described above will be described with reference to FIGS. 2 and 3. FIG. 2 is a flowchart showing an example of control of the cooling apparatus 1 according, to the embodiment of the invention. FIG. 3 is a graph showing variation of coolant temperature and variation of vehicle speed of a vehicle having the internal combustion engine 10 in which the cooling apparatus 1 according to the embodiment is incorporated. The control of the cooling apparatus 1 is performed by the ECU 19. The graph of FIG. 3 illustrates variation of coolant temperature in a comparative example as well as the variation of coolant temperature according to the embodiment. In the comparative example, the fan is not driven at the first drive voltage V1.

In step S1, it is determined whether a coolant temperature T acquired by the temperature sensor 14 is equal to or higher than the fan low-voltage activation threshold T2. When it is determined "No" in step S1, the processing proceeds to RETURN. When it is determined "Yes" in step S1, the processing proceeds to step S2. In step S2, it is determined whether the coolant temperature T is equal to or lower than the fan high-voltage activation threshold T3. When it is determined "No" in step S2, the processing proceeds to step S3. In step S3, the fan 18 is started to be driven by using the second drive voltage V2 as the drive voltage V of the fan 18 (high-voltage fan driving). After step S3, the processing proceeds to step S4. In step S4, it is determined whether the coolant temperature T is equal to or lower than the high-voltage activated fan stop threshold T1. If it is determined "No" in step S4, the processing of step S3 is repeated. Specifically, the fan 18 continues being driven at the second drive voltage V2. In contrast, if it is determined "Yes" in step S4, the processing proceeds to step S5. Instep S5, the high-voltage fan driving is turned OFF. The processing then proceeds to step S6. Since the fan high-voltage activation threshold T3 and the high-voltage activated fan stop threshold T1 have a relationship that T1<T3, hunting can be prevented during operation of the fan.

When it is determined "Yes" in step S2 as well, the processing proceeds to step S6. In step S6, it is determined whether a vehicle speed X acquired from the speed sensor 20 is equal to or lower than the vehicle speed threshold X1. This means that it is determined whether the vehicle is being operated at a low vehicle speed. During low vehicle speed operation, the radiator 15 receives little running wind and hence the coolant temperature is apt to rise. When it is determined "No" in step S6, the processing proceeds to RETURN. In contrast, when it is determined "Yes" in step S6, the processing proceeds to step S7. In step S7, the fan 18 is started to be driven by using the first drive voltage V1 as the drive voltage V of the fan 18. This suppresses the rising of the coolant temperature T as shown in FIG. 3. It should be noted that the state of low speed operation includes an idling state of the internal combustion engine 10.

If supposedly no fan low-voltage activation threshold T2 is provided, the coolant temperature T will rise, exceeding the fan low-voltage activation threshold T2 as shown in FIG. 3. This may result in occurrence of knocking. When knocking occurs, the learning function of the KCS may be activated to retard the ignition timing. This may possibly result in deterioration in fuel efficiency performance and motivity performance. The coolant temperature of the internal combustion engine 10 according to the embodiment is set lower than normal and the ignition timing is set in accordance with this coolant temperature. Therefore, if knocking occurs due to increase of the coolant temperature, the variation in amount of retardation by the KCS is increased, and the effect on fuel efficiency performance and motivity performance will also be increased.

When the fan 18 is driven, the rise of the coolant temperature is suppressed, whereby the occurrence of knocking is also suppressed. When the occurrence of knocking is suppressed, the fuel efficiency performance can be maintained high. In addition, the KCS is not activated, which also helps to maintain the fuel efficiency performance high. The deterioration in motivity performance also can be prevented.

The fan 18 is driven at the first drive voltage V1. Since the fan is driven at a low voltage, the power consumption (energy loss) can be suppressed, whereby the fuel efficiency performance can be maintained or improved. The airflow is reduced in comparison with when the fan 18 is driven at the second drive voltage V2, and hence the variation of coolant temperature can be made more moderate. As a result of this, variation in control may be suppressed. Further, the operating noise of the fan 18 is reduced, and the lifetime of the fan 18 may be prolonged.

After the processing of step S7, the processing proceeds to step S8. In step S8, it is determined whether the coolant temperature is equal to or lower than the low-voltage activated fan stop threshold T0. When it is equal to or lower than the low-voltage activated fan stop threshold T0, the coolant temperature may be maintained low even if the fan 18 is not driven, and the occurrence of knocking also may be suppressed. Accordingly, when it is determined "Yes" in step S8, the processing proceeds to step S9, and the driving of the fan 18 is turned OFF. After step S9, the processing proceeds to RETURN. In contrast, if it is determined "No" in step S8, the processing is repeated again from step S2 onward. Since there is a relationship that T0 <T2 between the fan low-voltage activation threshold T2 and the low-voltage activated fan stop threshold T0, the occurrence of hunting may be suppressed during operation of the fan.

As is shown in the flowchart of FIG. 4, the processing may proceed directly to step S3 without passing through step S2 when it is determined "No" in step S8. For example, if the coolant temperature T is not lowered even after the fan 18 is driven at the first drive voltage V1, the fan 18 may be driven at the second drive voltage V2.

The cooling apparatus 1 according to the embodiment of the invention as described above is capable of suppressing occurrence of knocking due to rise in coolant temperature, as well as energy loss, variation of coolant temperature, and noise caused by driving of the fan 18.

It should be understood that while the embodiments of the invention have been described, such description is for illustrative purposes only. The invention is not limited to these embodiments but various changes and modifications may be made without departing from the spirit and scope of the invention as hereinafter claimed. For example, when the vehicle is operated at a low vehicle speed, driving of the fan 18 may be simply started regardless of the state of the coolant temperature.

The invention claimed is:

1. A cooling apparatus for an internal combustion engine, comprising:
    a fan that cools a coolant by operating at least at a first drive voltage and a second drive voltage higher than the first drive voltage; and
    a control unit that drives the fan at the first drive voltage when a vehicle is driven at a low vehicle speed that is lower than a vehicle speed threshold and a coolant temperature is higher than a fan low-voltage activation threshold, wherein
    the control unit drives the fan at the second drive voltage when the coolant temperature does not become lower than a fan stop threshold after the fan is started at the first drive voltage.

2. The cooling apparatus for an internal combustion engine according to claim 1, wherein the fan stop threshold is a value lower than the fan low-voltage activation threshold.

3. The cooling apparatus for an internal combustion engine according to claim 1, wherein when a drive voltage of the fan is raised from the first drive voltage to the second drive voltage, the drive voltage is raised stepwise.

4. The cooling apparatus for an internal combustion engine according to claim 1, wherein when a drive voltage of the fan is raised from the first drive voltage to the second drive voltage, the drive voltage is raised linearly.

5. The cooling apparatus for an internal combustion engine according to claim 1, wherein the driving of the vehicle at the low vehicle speed includes an idling state of the internal combustion engine.

6. The cooling apparatus for an internal combustion engine according to claim 2, wherein when a drive voltage of the fan is raised from the first drive voltage to the second drive voltage, the drive voltage is raised stepwise.

7. The cooling apparatus for an internal combustion engine according to claim 2, wherein when a drive voltage of the fan is raised from the first drive voltage to the second drive voltage, the drive voltage is raised linearly.

8. The cooling apparatus for an internal combustion engine according to claim 2, wherein the driving of the vehicle at the low vehicle speed includes an idling state of the internal combustion engine.

9. The cooling apparatus for an internal combustion engine according to claim 3, wherein the driving of the vehicle at the low vehicle speed includes an idling state of the internal combustion engine.

10. The cooling apparatus for an internal combustion engine according to claim 4, wherein the driving of the vehicle at the low vehicle speed includes an idling state of the internal combustion engine.

11. A cooling apparatus for an internal combustion engine, comprising:
    a fan that cools a coolant by operating at least at a first drive voltage and a second drive voltage higher than the first drive voltage; and a control unit that drives the fan at the first drive voltage when a vehicle is driven at a low vehicle speed that is lower than a vehicle speed threshold and a coolant temperature is higher than a fan low-voltage activation threshold, wherein:

with regard to the coolant temperature, the control unit stores the fan low-voltage activation threshold for driving the fan at the first drive voltage, a low-voltage activated fan stop threshold for stopping the fan that is driven at the first drive voltage, a fan high-voltage activation threshold for driving the fan at the second drive voltage, and a high-voltage activated fan stop threshold for stopping the fan that is driven at the second drive voltage, and the control unit drives the fan based on the thresholds; and the thresholds have a relationship of the low-voltage activated fan stop threshold<the high-voltage activated fan stop threshold<the fan low-voltage activation threshold<the fan high-voltage activation threshold.

12. The cooling apparatus for an internal combustion engine according to claim 1, wherein driving of the vehicle at the low vehicle speed includes an idling state of the internal combustion engine.

\* \* \* \* \*